June 26, 1956
S. J. SMITH
2,752,543
ELECTRICAL CONDENSER
Filed June 11, 1953
2 Sheets-Sheet 1
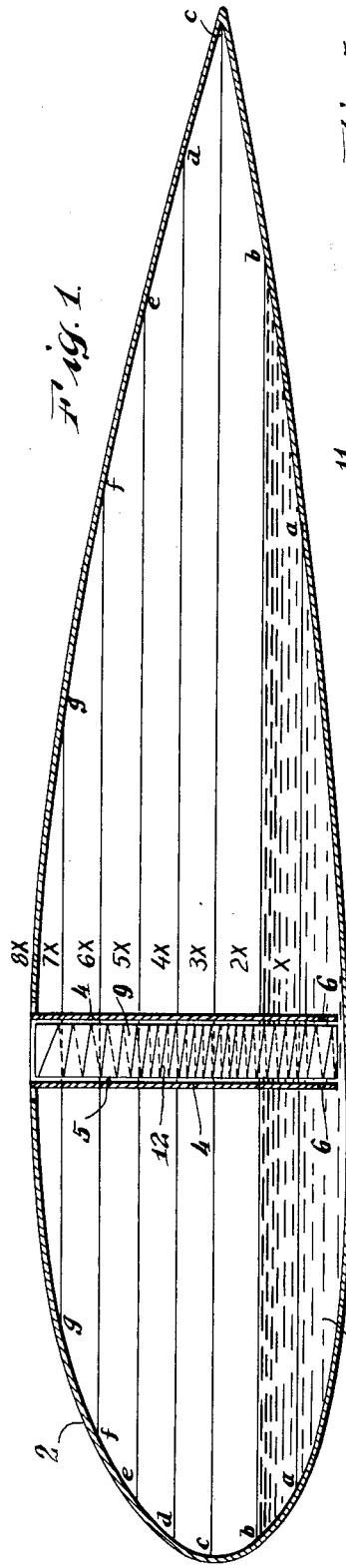
INVENTOR.
Stanley J. Smith
BY Churchill, Rich, Weymouth & Engel
ATTORNEYS.

June 26, 1956  S. J. SMITH  2,752,543
ELECTRICAL CONDENSER
Filed June 11, 1953  2 Sheets-Sheet 2

INVENTOR.
Stanley J. Smith
BY Churchill, Rich, Weymouth & Engel
ATTORNEYS.

United States Patent Office 2,752,543
Patented June 26, 1956

2,752,543

ELECTRICAL CONDENSER

Stanley James Smith, Briarcliff, N. Y., assignor to Simmonds Aerocessories, Inc., Tarrytown, N. Y., a corporation of New York Application June 11, 1953, Serial No. 361,002

10 Claims. (Cl. 317—246)

This invention relates to electrical condensers or capacitors and more particularly to condensers which have along at least part of their length a non-uniform capacitance per unit length. More specifically, the invention relates to fluid-contents sensing capacitors for measuring the quantity or mass of a non-gaseous dielectric fluid present in an irregularly shaped container.

Typical capacitance-type fluid contents measuring systems employ a source of alternating voltage, a first circuit including a fluid-contents sensing capacitor for vertical immersion in the dielectric fluid of a container to substantially the full depth, and a second circuit including a comparison or reference capacitor, the currents through the two circuits being utilized in a typical installation in conjunction with a suitable fluid-contents indicating device so that the indicating device responds to the difference or ratio between the currents as an index of change in the capacitance of the sensing capacitor due to the change in dielectric constant caused by change in fluid level.

If the container of the fluid to be measured is regular in shape in the sense that there is a linear relationship between change in fluid level with change in fluid quantity, then a measuring condenser may be employed in which the capacitance per unit length or height is substantially constant, and the indicating device may be linearly calibrated in terms of fluid quantity as well as fluid level. The sensing capacitors commonly used have such a linear capacitance-length law, usually comprising two concentric metal tubes having opposed cylindrical electrode surfaces, a tubular form being preferred from the standpoint of compactness and structural strength.

However, fluid containers are frequently irregular in shape in the sense that there is a non-linear relationship between change in fluid level with change in fluid quantity. For example, aircraft fuel tanks are fitted to the aircraft structure in such a manner as to make best use of the limited space available. As a result, aircraft fuel tanks may assume a variety of relatively complex shapes. It is apparent that if a sensing condenser having a linear capacitance-length is immersed in an irregular fuel tank, the fuel indicator will yield correct level indications but will not yield correct quantity or mass indications unless the indicator is calibrated non-linearly which, of course, makes accurate scale readings difficult for the pilot.

It is known to modify the normally uniform capacitance-length law of a sensing condenser consisting of two concentric metal tubes either by varying the diameter of one of the tubes along part of its length, or by removing part of the wall material along part of the length of one tube, or by bending the tubes from their vertical axis along part of their length. However, such methods weaken the structure and are not adapted to mass production of capacitors to close tolerances, the capacitors so produced being incapable of providing accurate correlation between change in capacitance with change in fluid quantity, especially at those levels where an abrupt change in container shape occurs.

In my U. S. Patent No. 2,582,399, filed January 12, 1949, issued January 15, 1952, I disclose an improved capacitor for sensing the quantity of fluid present in an irregular container wherein it is possible, except for certain limitations hereinafter discussed, to establish a linear law between change in capacitance with change in fluid quantity in such irregular container. Of course, if such a linear law can be established, there is no need to go to the trouble of providing the indicator scale with a non-linear calibration. Such a linear law is made theoretically possible in my U. S. Patent No. 2,582,399 by providing a sensing condenser which comprises a tube of insulation material having a metallic layer applied to a part only of one cylindrical surface of the tube. The metallic layer constitutes one electrode surface of the condenser and cooperates capacitively with an opposed, completely cylindrical second electrode surface to establish the sensing capacitance, the metallic layer having a profiled or contoured shape specially correlated with the irregular shape of the condenser at every level so that the circumferential extent of the layer at every level is proportional to the sruface area of the fluid at that level.

However, from the design, manufacturing and operational standpoint, experience has shown that certain significant limitations inhere in the above-described profiled condenser. In constructing the profiled condenser in accordance with the teachings of my U. S. Patent No. 2,582,399, the following procedure has been adopted. A pattern or mask is first prepared by marking on a plain sheet of material an outline or profile which corresponds to the desired outline of the metallic layer correlated with the irregular shape of the container. The surface area on the mask bounded by such outline is then cut out and discarded. The mask is then wrapped around the outer surface of the insulation tube and the exposed portion sprayed with a vaporized metal such as aluminum or zinc to form the profiled metallic layer or coating on such outer surface of the insulation tube. The mask is then removed, and the coated tube is mounted inside the cylindrical outer electrode to form the completed capacitor.

In practicing the above method, difficulty has been experienced in accurately defining the required area physically and in applying the metallic coating with a uniform thickness. Also, during the spraying operation, considerable metal is wasted by being unavoidably deposited upon the profiled edge portion of the mask rather than just upon the exposed surface of the insulation tube.

One of the more serious limitations placed upon the use of such profiled coating-type condensers in aircraft fuel tanks arises from the fact that heretofore all available insulation tubing, generally a tubing of phenolic resin-impregnated paper, is mechanically and chemically unstable when exposed to different fuels and operating humidity and temperature conditions. Thus, it has been necessary to apply elaborate protective coatings to all parts of the tubing before it can be used. Commercially available insulation tubing is also subject throughout its length to relatively wide variations in diameter which results in a considerable rejection of tubes and finished units.

Moreover, experience has shown that the capacitance of such profiled coating-type condensers is a function not only of the opposed electrode surface area and the electrode separation distance but is also affected by an additional factor, viz., additional capacitance caused by the fringing electrostatic flux lines existing between the irregularly profiled edge of the metallic layer and the outer cylindrical electrode. There is also a spurious capacitance between the inner surface of the metallic layer and part of the outer electrode. The contribution which such edge effects and spurious capacitance make to the total capacitance between the electrodes is not easily calculated but must somehow be dealt with if the profiled coating-type capacitor is to be employed in those applications which require a high degree of accuracy in the correlation between change in capacitance and change in fluid quantity in the irregular container.

Another important limitation is such a profiled coating-type condenser is that the metallic layer does not extend completely around the circumference of the insulation tubing and hence from a production standpoint such a condenser does not lend itself to a simple construction employing standard tubular components for permitting adjustment of initial capacitance per unit length or height by a constant percentage throughout the entire length or height of the condenser so as to compensate for variations in capacitance, caused, for example, by variations in the diameter of the insulation tubing, to preserve the desired non-linear law.

The term "length" of condenser as used in the specification and claims is intended to refer to the height of the condenser when the condenser is mounted vertically in a container, as is Fig. 1. Thus in Fig. 1, the "length" and height of condenser 1 may be considered as one and the same dimension extending along the vertical axis Y—Y.

Accordingly, it is an object of the present invention to provide a new type of non-linear condenser which avoids the above limitations and yet is capable of accurately establishing any desired non-linear capacitance-length law throughout its length.

It is another object of the present invention to provide a new type of non-linear condenser which may be constructed in a rapid and accurate manner with a minimum of expense.

It is a further object of the present invention to provide a new type of non-linear condenser which permits a simple construction facilitating adjustment of initial capacitance per unit length or height by a constant percentage throughout its entire length or height.

It is a further object of the present invention to provide a new type of non-linear sensing capacitor for use in a capacitance-type gage to measure the quantity of a dielectric fluid present in an irregularly shaped container wherein there is readily obtainable an accurate correlation throughout the height of the capacitor between change in capacitance and change in fluid quantity within such container irrespective of how irregular the shape of the container may be.

It is a still further object of the present invention to provide a new type of non-linear fluid-quantity sensing capacitor wherein the non-linear electrode may be supported by means which will not deteriorate upon exposure to different fluids or varying conditions of humidity and temperature.

According to one aspect of the present invention, there is provided a condenser which has along at least part of its length a non-uniform capacitance per unit length characteristic, the condenser comprising two spaced electrodes extending along the length of the condenser, one of the electrodes comprising a plurality of interconnected turns of electrically conductive material which are distributed in series fashion along the condenser length, there being provided predetermined non-uniform spacing between the adjacent turns which occupy the non-uniform capacitance portion, so that along the condenser length the effective opposed electrode surface area per unit length is a minimum where the minimum capacitance per unit length is desired and the effective opposed electrode surface area per unit length is a maximum where the maximum capacitance per unit length is desired.

According to another aspect of the present invention, there is provided a condenser wherein the increase in total capacitance with increasing length follows a predetermined non-linear relationship or law, the condenser comprising two spaced electrodes extending along the length of the condenser, one of the electrodes comprising a coil or winding of electrically conductive material with a plurality of turns distributed along the condenser length, the number of turns per unit length being varied along the condenser length to establish such predetermined non-linear law.

According to another aspect of the present invention, there is provided a condenser wherein the incremental capacitance corresponding to uniform increments of length taken along the length of the condenser varies along the condenser length in accordance with a desired predetermined non-linear relationship or law, the condenser comprising two spaced electrodes coextending along the condenser length, one of the electrodes comprising a winding of electrically conductive material of substantially uniform cross-section, the winding having a plurality of turns distributed along the condenser length so that such winding presents to the electrode surface of the other electrode a tortuous electrode surface path extending along the condenser length, each discrete distance along such tortuous path which corresponds to a respective increment of length being substantially proportional to the incremental capacitance which it is desired to establish for such respective increment of length, whereby the effective opposed electrode surface area of the condenser for each increment of length is also substantially proportional to the incremental capacitance desired for such respective increment of length.

According to another aspect of the present invention, there is provided a condenser wherein there is a predetermined non-linear relationship between capacitance and condenser length, the condenser comprising two spaced electrodes extending along the length of the condenser, and a metal core extending along the length of the condenser, one of the electrodes comprising a helical winding of varying pitch disposed around the core along the condenser length, the winding pitch being varied along the condenser length to establish such predetermined non-linear relationship between capacitance and condenser length.

According to another aspect of the present invention, there is provided a sensing capacitor for use in a capacitance-type gage for measuring the quantity or mass of a non-gaseous dielectric fluid present in an irregularly shaped container, the capacitor having a capacitance-height characteristic wherein the increase in total capacitance with increasing height follows substantially the same non-linear law as does the increase in total fluid quantity with increasing fluid level, the capacitor comprising two spaced electrodes extending throughout the height of the capacitor and adapted to be mounted in the irregular container for immersion in the fluid to substantially the entire fluid depth and to receive the fluid in the space between the electrodes, one of the electrodes comprising a coil or winding of electrically conductive material, the winding having a plurality of turns of varying pitch disposed one above the other throughout the capacitor height and having the pitch between adjacent turns or the number of turns per unit height varied throughout the capacitor height to establish said non-linear law between increase in total capacitance with increasing capacitor height.

According to another aspect of the present invention, there is provided a fluid contents sensing capacitor comprising two spaced electrodes extending throughout the capacitor height and adapted to be mounted in an irregularly shaped fluid container for immersion in the fluid to substantially the entire fluid depth and to receive the fluid in the space between the electrodes so that the capacitance between the electrodes is a function of the fluid level, one of the electrodes comprising a winding of electrically conductive material having a substantially uniform cross-section with a plurality of turns disposed one above the other throughout the capacitor height, the spacing between adjacent turns being correlated throughout the capacitor height with the non-linear change in the surface area of the fluid in the container with height so that at every height of the capacitor the rate of change in capacitance per unit height is substantially proportional to the surface area of the fluid in the container at the height and hence is also substantially proportional to the rate of change in fluid quantity per unit height at that height.

According to another aspect of the present invention, there is provided a fluid contents sensing capacitor comprising two spaced electrodes extending throughout the capacitor height and adapted to be mounted in an irregularly shaped fluid container for immersion in the fluid to substantially the entire fluid depth and to receive the fluid in the space between the electrodes so that the capacitance between the electrodes is a function of the fluid level, one of the electrodes comprising a winding of electrically conductive material having a substantially uniform cross-section with a plurality of turns disposed one above the other throughout the capacitor height so that the winding presents to the electrode surface of the other electrode a tortuous electrode surface path extending throughout the capacitor height, each discrete distance along such tortuous path which corresponds to a respective uniform increment of height being substantially proportional to the change in fluid quantity in the container for said respective increment of height, whereby the effective opposed electrode surface area of the condenser for each increment of height is also substantially proportional to the change in fluid quantity in the container for said respective increment of height.

The foregoing and other objects and advantages will become apparent from the following description of embodiments of the present invention given by way of example with reference to the accompanying drawings, wherein:

Figure 1 is an elevational cross-section view illustrating diagrammatically one form of condenser according to the present invention, the condenser serving as a fuel quantity sensing device in an aircraft fuel tank;

Fig. 1a is an elevational view illustrating in greater detail the construction of the condenser of Figure 1;

Figure 2 is a cross-section of the condenser of Figure 1a taken along line 2—2 and illustrating diagrammatically one manner in which the condenser electrodes of Figure 1 may be adjustably mounted to permit adjustment of initial capacitance uniformly throughout the condenser height;

Figure 3 is an elevational view illustrating a modified form of condenser according to the present invention;

Figure 4 is an enlarged cross-section of the condenser of Figure 3 taken along the line 4—4;

Figure 5 is an elevational view illustrating a further modified form of condenser according to the present invention;

Figure 6 is an enlarged cross-section of the condenser of Figure 5 taken along the line 6—6;

Figure 8 is a fragmentary cross-sectional view illustrating one manner in which the electrode winding may be mounted on support means; and Figure 9 is a fragmentary cross-sectional view illustrating another manner in which the electrode winding may be mounted on support means.

Figure 7:
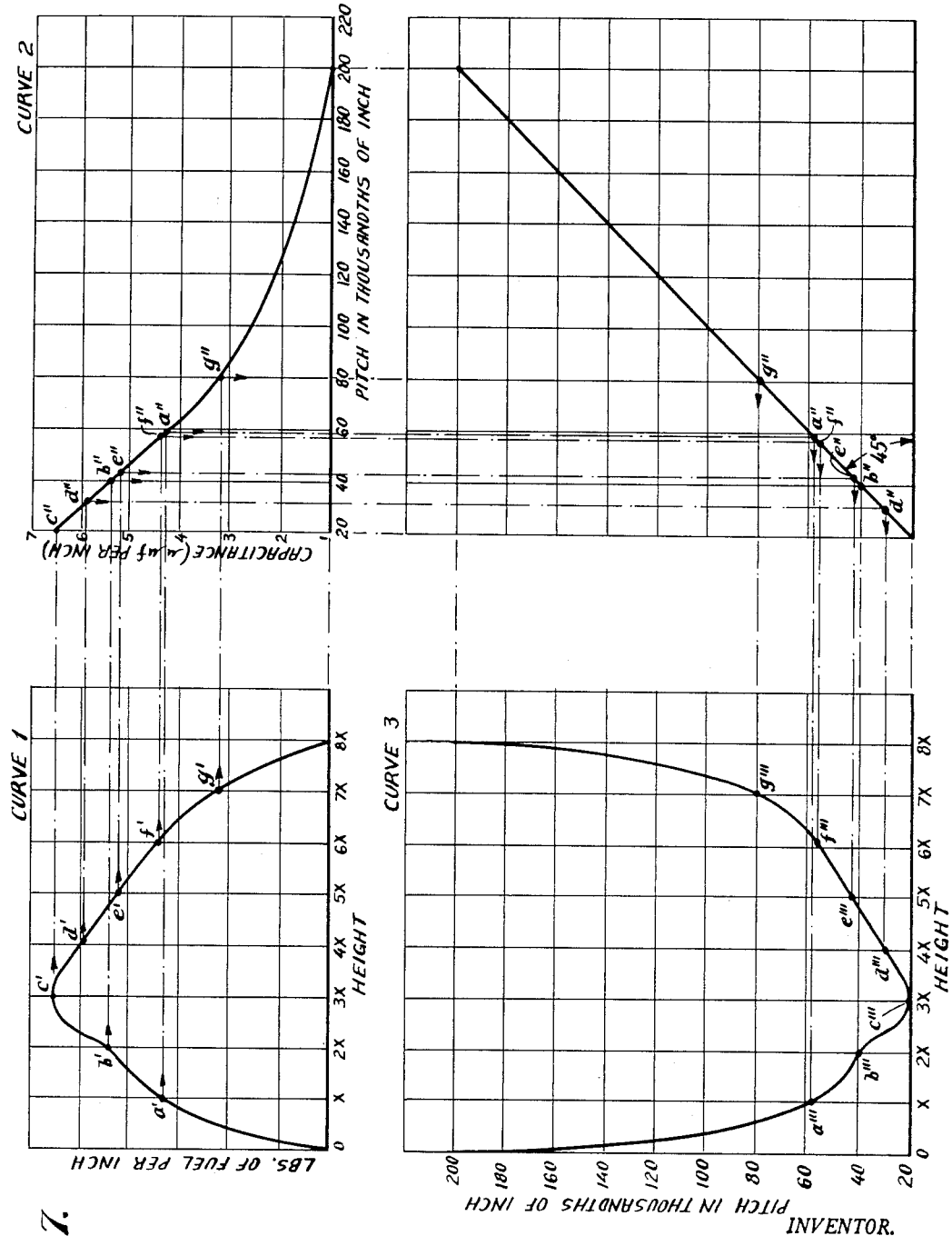
Figure 7 illustrates a graphical method which may be employed to derive for any given irregular shape of container the necessary variation in the spacing between adjacent turns of the active electrode winding in the condensers of Figs. 1–6.

Referring to Fig. 1 and Fig. 1a, there is indicated generally a preferred form of condenser installed within a foil-shaped fuel tank 2 which is fitted inside the wing of an aircraft. The condenser is vertically mounted through an opening in the top of the tank for immersion in the fuel 3 to substantially the full depth of the fuel. The outer electrode of the condenser is in the form of a metal cylinder 4 enclosing the inner electrode member indicated generally at 5. Cylinder 4 is provided with appertures 6 to admit fuel into the space between the inner and outer electrodes.

The inner and outer electrodes are spaced apart by suitable means at the top and bottom of the condenser such as by insulation members 7 and 8. Cylinder 4 is connected to terminal 20 as shown.

Mounted between insulation members 7 and 8 is a cylindrical metal core 9, preferably aluminum, which may be connected via flexible connector 10 and terminal 11 to electrical ground when the condenser is placed in circuit. Disposed around core 5 and insulated therefrom is a winding 12 of electrically conductive material of substantially uniform cross-section, preferably an insulated copper or aluminum wire. Winding 12 has its upper end connected via flexible connector 21 to terminal 22. Winding 12 is in the form of a helix or cylindrical spiral but having the pitch or spacing between adjacent turns or the number of turns per unit height varied along the condenser height so as to obtain a desired non-uniform capacitance per unit height vs. height characteristic wherein there is produced throughout the height of the condenser a linear law relating change in the total capacitance of condenser 1 with change in fluid quantity in the irregular tank. The desired relationships defined from various aspects have been set forth above and hence will not be redescribed.

In Fig. 1 the relative distribution of the turns of winding 12 throughout the condenser height has been approximated for purposes of illustration, although it will be appreciated that in actual practice there may be considerably more turns per unit height than are shown in Fig. 1, depending upon the wire diameter employed and the range of capacitances desired. It will be appreciated that minimum winding pitch and thus maximum rate of change in the effective opposed electrode surface area per unit height occurs at the level or levels where there is a maximum surface area of fluid in the tank and hence corresponding to a maximum rate of change in fluid quantity per unit height, and maximum winding pitch and thus minimum rate of change in the effective opposed electrode surface area per unit height occurs at the level or levels where there is a minimum surface area of fluid in the tank and hence corresponding to a minimum rate of change in fluid quantity per unit height.

It is important to note that, as a general proposition, every winding or coil in the form of a helix or cylindrical spiral produces, when employed as one electrode of a condenser, an inherent non-linear relationship shown by curve 2 of Fig. 7 between change in capacitance per unit length with change in pitch. Theoretically, this relationship would be a square-law relationship except for the effect of distributed capacitance between the more closely spaced adjacent turns. This distributed capacitance is responsible for the linear portion of the curve corresponding to the smaller pitch values.

In practicing the present invention, this inherent non-linear relationship between change in capacitance per unit height with change in pitch is taken into account and a graphical method or its equivalent is utilized to derive the pitch vs. height characteristic necessary for accurate correlation of capacitance per unit height with any given irregularly shaped container. Fig. 7 illustrates how such a graphical method may be employed to derive the pitch vs. height characteristic necessary to correlate the capacitance per unit height of condenser 1 with the specific shape of tank 2 in Fig. 1.

In Fig. 1 the fuel tank 2 is divided into a series of volumetric sections or zones by a series of imaginary horizontal planes passing through the tank at levels X, 2X, 3X, etc., which are spaced apart by uniform increments X of height. Each increment X equals a predetermined number of units of height, the unit of height being, for example, one inch or one foot. Let it be assumed that fuel tank 2 has at all points along its dimension which extends along the length of the aircraft wing the same vertical cross-section as is shown in Fig. 1. Hence, the total volume of fuel tank 2 is proportional to the total vertical cross-sectional area of tank 2 shown in Fig. 1. Referring to Fig. 1, at level X there occurs a rate of change of fuel quantity per unit height, or rate of change of fuel mass per unit height, which is proportional to the distance a—a. If distance a—a corresponds to a rate of change of A pounds per inch, then distance b—b corresponds to a rate of change of B pounds per inch, distance c—c corresponds to a rate of change of C pounds per inch, etc.

Curve 1 of Fig. 7 is plotted as follows: By employing the necessary conversion constant, the distances a—a, b—b, c—c, etc. of Fig. 1 may be translated into respective ordinates $a'$, $b'$, $c'$, etc. of curve 1 which correspond to the magnitudes A, B, C, etc. Curve 7 shows for the particular shape of container 2 the variation in mass per unit height with height.

Curve 2 of Fig. 7 represents the general relationship referred to above which exists between capacitance per unit height and the pitch when the pitch of a condenser electrode winding such as winding 12 is varied from a minimum to a maximum pitch. The values for curve 2 were obtained at 400 cycles per second with an inner electrode winding which had a wire diameter of 0.01 inch, the outside diameter of the winding being approximately 1.27 inches and the inside diameter of the outer cylindrical electrode of aproximately 1.88 inches. The horizontal axis of curve 2 is an extension of the horizontal axis of curve 1. The range of curve 2 is suppressed so that the vertical and horizontal intercepts occur at finite maximum and minimum values of capacitance per unit height.

Curve 3 of Fig. 7 indicates the winding distribution of winding 12 which is required for accurate correlation with the specific shape of tank 2. Curve 3 is generated as follows: The vertical axis for curve 3 is an extension of the vertical axis of curve 1. The horizontal axis for curve 3 is laid out directly below curve 1 and the uniform divisions of height X, 2X, 3X, etc. of curve 1 are projected downwardly on to the horizontal axis for curve 3. A 45° projection or transfer line is provided as shown. Points $a'$, $b'$, $c'$, $d'$, $e'$, $f'$ and $g'$ of curve 1 are then each projected across horizontally to the right until they intercept curve 2. The corresponding intercept points $a''$, $b''$, $c''$, etc. on curve 2 are then projected vertically downward until they intercept the 45° projection line from which they are projected horizontally across to the left underneath curve 1 until they intersect respectively with the vertical projections extending downwardly from points $a'$, $b'$, $c'$, etc. of curve 1. These points of intersection $a'''$, $b'''$, $c'''$, etc. are then connected together to form curve 3 which has pitch on the vertical axis and height on the horizontal axis. It is apparent that curve 3 is a distorted inverse of curve 1, the amount of distortion being determined by the non-linearity in the general capacitance per unit height characteristic represented by Fig. 2. Although only eight increments X of height were employed in Fig. 1 for purposes of illustration, it is apparent that there may be employed as many increments of height as is necessary for required accuracy in plotting curve 1.

In order to compensate for dimensional tolerances in the production of sensing condensers, provision is made to adjust the initial capacitance of the condenser. Since the active electrode 12 is a winding which extends continuously around the core tube 9 from top to bottom, over-all initial capacitance may be uniformly adjusted by a constant percentage simply by transversely displacing the central axis of one of the electrodes with respect to the central axis of the other electrode. In Fig. 1a, line Y—Y represents the common central axis of both the inner and outer electrodes. Cylinder 4 is shown fixedly mounted between insulation members 7 and 8. Cylindrical core 9 which supports winding 12 is provided with end members 13 and 14, respectively at the top and bottom of the core. Rigidly secured respectively to end members 13 and 14 and lying along an eccentric axis Z—Z are pivot shafts 15 and 16. Shaft 16 is mounted for rotation in bearing 17 in insulation member 8. Shaft 15 is mounted for rotation in sleeve bearing 18 in insulation member 7 and extends through member 7. A knurled nut 19 or other suitable adjustment means is rigidly attached to the projecting end of shaft 15 to permit rotation of shaft 15 and hence also core 4 and electrode winding 12. Suitable locking means such as set-screw 19' ensure that shaft 15 remains in the desired rotary position after rotation. As best seen in Fig. 2, when core 4 and electrode winding 12 are rotated about eccentric axis Z—Z from their concentric position to an eccentric position, as indicated by dotted lines at 9', the effective separation distance between inner and outer electrodes is changed, causing a uniform change in capacitance per unit height throughout the condenser height.

If relative rotation between the inner and outer electrodes is not desirable, then the necessary transverse relative displacement may be accomplished, for example, by replacing pivot shafts 15 and 16 with rods of rectangular cross-section adapted to slide in suitable slots in members 7 and 8.

The condenser illustrated in Figs. 3 and 4 is a modification of the condenser of Fig. 1a. In Figs. 3 and 4, the inner and outer electrodes have cross-sections which are in the form generally of flattened cylinders or ellipses. Core 23 comprises a rectangular metal member 24 with longitudinally extending metal members 25 and 26 attached to respective ends of member 24. As shown best in Fig. 4, the outer surfaces of end members 25 and 26 are curved so as to facilitate good surface contact with electrode winding 27. Surrounding core 23 and winding 27 is the solid metal outer electrode 28. Electrode 28 is provided with apertures 29 to admit fluid into the space between the electrodes.

The variation in pitch or distribution of the turns of winding 27 which is required for correlation with any specific shape of container may be established in essentially the same way as previously described. Curves similar to curves 1 and 2 of Fig. 7 may be plotted and the necessary pitch vs. height characteristics derived as was done in connection with curve 3 of Fig. 7.

Since the inner and outer electrodes of the condenser shown in Figs. 3 and 4 are not cylindrical, adjustment of initial capacitance uniformly throughout the condenser height can be readily achieved by rotating either electrode about the common central axis Y—Y. Accordingly, in Fig. 3, shafts 30 and 31 are rigidly secured to the top and bottom, respectively of core member 24 along the common central axis Y—Y. Shafts 30 and 31 are mounted for rotation in insulation members 32 and 33 in otherwise the same manner as shafts 15 and 16 of Fig. 1a.

The condenser illustrated in Figs. 5 and 6 represents a further modification. Instead of employing the metal cylinder 4 of Fig. 1a or the electrode 28 of Fig. 3 as the second electrode cooperating with the electrode winding to form the condenser, a second electrode winding 35 is employed cooperating with the electrode winding 34 to form the condenser. The upper end of winding 35 is connected via a flexible connector to a terminal 38. As shown in Fig. 5, windings 34 and 35 preferably are spaced apart around core 23 at a uniform distance throughout the height of the condenser and present opposed electrode surfaces to each other. Considered as a unit the electrodes may be described as consisting of a bifilar winding. Here, as in Figs. 1 and 3, the dielectric fluids will occupy the space between the opposed electrode surfaces as the fluid level rises and will vary the capacitance accordingly. The variation in lead or the distribution of the turns of windings 34 and 35 may be established by following essentially the same teachings disclosed in connection with the condenser of Fig. 1a, minimum lead being required for the level or levels where maximum change in fluid quantity per unit height occurs and maximum lead for the level or levels where minimum change in fluid quantity per unit height occurs.

Any suitable means may be employed to adjust the spacing between windings 34 and 35 uniformly throughout the condenser length so as to alter the initial capacitance uniformly throughout the condenser height. For example, winding 35 may be tightly but movably fitted around core 23 so that winding 35 can be twisted closer or farther apart from winding 34 as desired. The windings 34 and 35 and the core may be cylindrical where desired.

Fig. 8 illustrates one manner in which the electrode windings of Figs. 1a, 3 and 5 may be mounted on the core means. The electrically conductive material of which the windings are composed is preferably a copper or aluminum wire and the core is preferably metal. Hence, the wire must be insulated in some manner from the core. In order that the general relationship, shown in curve 2 of Fig. 7, between capacitance per unit height and winding pitch will conform closely to the theoretical approximately square-law relationship, the insulation thickness should be at a minimum. It has been found that this condition is satisfied by using an insulation coating of between 0.001 inch to 0.002 inch when the wire diameter is 0.01 inch. Even normal wire insulation of the synthetic enamel type is satisfactory. However, wire insulated with "Teflon" is now commercially available and has the very valuable advantage of repelling water and also has a much lower dielectric constant.

In Fig. 8 a fragmentary portion of the core means is shown in cross-section at 39. The wire 40 of adjacent turns is covered with a thin layer of insulation 41. Varnish or other adherent material 42 serves to locate the turns on the core means sufficiently so as to prevent slipping when differential thermal expansion and contraction takes place during operation.

Fig. 9 illustrates another manner in which the electrode windings may be mounted on the core means. Core 43 is provided with shallow grooves 44 spaced the proper distance apart so as to give adjacent turns the required spacing or pitch. Where the core is cylindrical as in Fig. 1a, then of course the grooves will have the shape of a cylindrical spiral or helix with the same varying spacing or pitch as is required for the winding which is to rest within the groove.

While specific embodiments of the present invention have been described, it is apparent that other modifications will occur to those skilled in the art, and it is to be understood that the specific embodiments are not presented by way of limitation but that the present invention comprehends all constructions coming within the scope of the appended claims.

The term "non-gaseous dielectric fluid" as employed in the specification and claims includes dielectric liquids and powdered, granular or other particle-form solid dielectric materials.

I claim:

1. An electrical condenser wherein the total capacitance varies with increase in condenser length in accordance with a predetermined non-linear law, comprising support means extending along the length of the condenser, a first condenser electrode comprising a continuous winding of electrically conductive material having a substantially uniform cross-section and disposed around said support means along said length, and a second condenser electrode comprising a continuous winding of electrically conductive material having a substantially uniform cross-section and disposed around said support means along said length at a substantially uniform distance from said first electrode winding throughout said length, predetermined different pairs of adjacent turns of said first electrode winding having different relative spacings along said length to establish said predetermined non-linear law.

2. An electrical condenser according to claim 1 wherein said support means comprises a metal core having a substantially circular transverse cross-section and the windings of said first and second electrodes are both metal wires covered with thin electrically insulating material, said wires being wires of substantially helical shape and disposed in uniformly spaced interjacent relation around said core.

3. An electrical condenser according to claim 1 wherein said support means comprises a core having a substantially rectangular transverse cross-section and the windings of said first and second electrodes are metal wires disposed in uniformly spaced interjacent relation around said support means so as to assume the general shape of flattened helices.

4. In a capacitance-type gage for measuring variations in the quantity of a non-gaseous dielectric fluid present in an irregularly shaped container having a non-linear fluid quantity versus fluid level characteristic, a measuring condenser comprising a core member and first and second spaced condenser electrodes all extending throughout the height of the condenser and adapted to be mounted in the irregular container for immersion in the fluid therein to substantially the full depth of the fluid and to receive the fluid in the space between said electrodes, said first and second condenser electrodes each comprising a continuous winding of electrically conductive material of substantially uniform cross-section, said windings being uniformly spaced apart throughout their length and disposed around said core member throughout the condenser height, the lead of said windings being substantially inversely proportional to the change in fluid quantity per unit height of said quantity versus level characteristic throughout the height of the condenser, whereby the change in capacitance between any two heights of the condenser is substantially proportional to the change in fluid quantity in the irregular container between the two fluid levels corresponding to said two heights.

5. In a capacitance-type gauge a measuring condenser according to claim 4, wherein said core member is composed of metal and said first and second electrode windings comprise metal wires covered with thin electrically insulating material and disposed interjacently around said core member.

6. An electrical condenser wherein the incremental capacitance corresponding to uniform increments of length along the length of the condenser varies along the condenser length in a predetermined manner, comprising a support and a pair of mutually insulated coextensive wire-like electrodes uniformly spaced apart throughout their length and distributed over a tortuous path upon said support along its length, with each segmental length of said electrodes along said tortuous path which corresponds to a respective increment of condenser length being substantially proportional to the predetermined incremental capacitance corresponding to said respective increment of condenser length.

7. An electrical condenser according to claim 6, wherein said support is formed of electrically conductive material and provided with means for connecting it to ground potential, and said wire-like electrodes are both metal wires covered with thin electrically insulating material.

8. An electrical condenser according to claim 6, wherein one of said wire-like electrodes is movably mounted upon said support whereby said uniform spacing may be varied.

9. In a capacitance-type gage for measuring variations in the quantity of a non-gaseous dielectric fluid present in a container having a non-linear fluid quantity versus fluid level characteristic resulting from variations in the cross-sectional area of the container throughout its height, a measuring condenser comprising at least a pair of mutually insulated coextensive wire-like electrodes uniformly spaced apart throughout their length and distributed over a tortuous path throughout the height of the condenser upon a common support, the condenser being adapted to be mounted in the irregular container for immersion in the fluid therein to substantially the full depth of the fluid and to receive the fluid in the space between said electrodes, the length of said electrodes along said tortuous path per unit height of the condenser being substantially proportional to the volume of the zone of said container corresponding to said unit height at the level thereof, whereby the change in capacitance between any two heights of the condenser is substantially proportional to the change in fluid quantity in said container between the two fluid levels corresponding to said two heights.

10. In a capacitance-type gage for measuring variations in the quantity of a non-gaseous dielectric fluid present in an irregularly shaped container having a non-linear fluid quantity versus fluid level characteristic, a measuring condenser comprising a pair of electrodes in the form of a bifilar winding of uniformly spaced mutually insulated wire of varying lead extending throughout the height of said condenser and adapted to be mounted in the irregular container for immersion in the fluid therein to substantially the entire depth of the fluid, the lead of said winding being substantially inversely proportional to the change in fluid quantity per unit height of said quantity versus level characteristic throughout the height of the condenser, whereby the change in capacitance between any two heights of the condenser is substantially proportional to the change in fluid quantity in the irregular container between the two fluid levels corresponding to said two heights.

References Cited in the file of this patent

UNITED STATES PATENTS

| 1,744,092 | Wrape | Jan. 21, 1930 |
| 2,529,015 | Levkovitsch | Nov. 7, 1950 |
| 2,648,982 | Condon | Aug. 18, 1953 |

FOREIGN PATENTS

| 577,636 | France | June 7, 1924 |